Jan. 23, 1968    M. A. VIGEN    3,364,665
AGRICULTURAL ROLLER
Filed June 21, 1965    2 Sheets-Sheet 1

INVENTOR.
MURLAN ARLEIGH VIGEN
BY
Merchant, Merchant & Gould
ATTORNEYS

Jan. 23, 1968 M. A. VIGEN 3,364,665
AGRICULTURAL ROLLER
Filed June 21, 1965 2 Sheets-Sheet 2
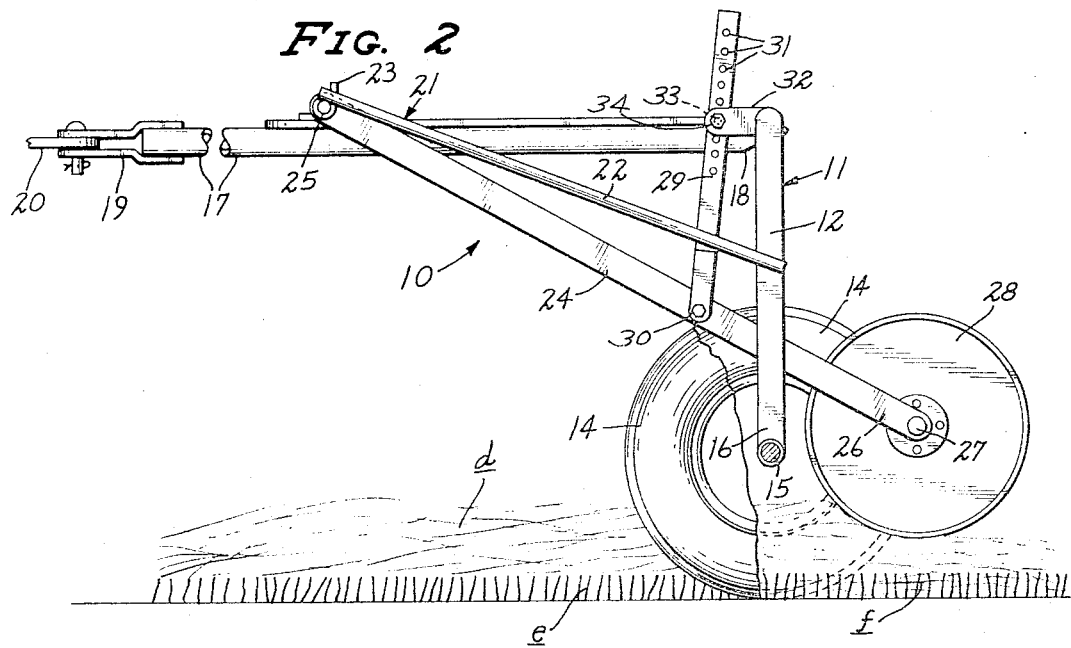
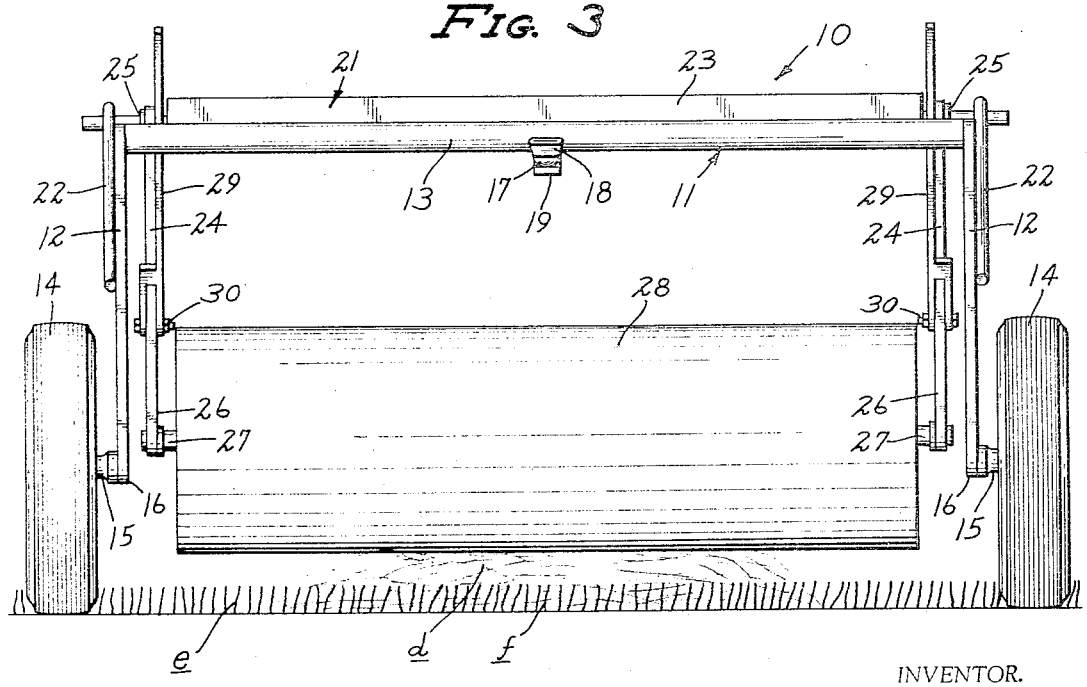
INVENTOR.
MURLAN ARLEIGH VIGEN
BY
Merchant, Merchant & Gould
ATTORNEYS

3,364,665
AGRICULTURAL ROLLER
Murlan Arleigh Vigen, Portland, N. Dak. 58274
Filed June 21, 1965, Ser. No. 465,327
3 Claims. (Cl. 56—1)

My invention relates generally to agricultural equipment and more particularly to a device for anchoring a harvested crop, which has been placed in windrows, to the underlying stubble.

During harvesting operations, cut crops such as hay or the like, are formed into windrows for the purpose of drying prior to gathering and subsequent storage. Such windrows being formed by agricultural mechanisms such as swathers and rotary rakes. During the drying process, the windrowed crop is often subjected to heavy or gusty wind conditions which may scatter or blow same across the field. In such event, additional time and labor is expended in again gathering same into windrows or undue waste occurs if same is left in the field.

Therefore, it is a principal object of my invention to provide a device which will anchor a windrowed crop to the underlying stubble.

It is another object of my invention to provide a device which may be directly attached to a windrowing mechanism for simultaneous operation therewith, Still another object of my invention is the provision of a device which incorporates but a minimum of moving parts, is extremely simple and inexpensive to construct, and requires but a minimum of skill to operate.

These and other objects will become apparent to those skilled in the art upon consideration of the accompanying specification, drawings and appended claims.

Referring to the several views in the accompanying drawings wherein like characters indicate like parts:

FIG. 2 is an enlarged view in side elevation as seen from left to right of FIG. 1, portions thereof broken away and shown in section; and FIG. 3 is an enlarged view in rear elevation thereof.

Figure 1:
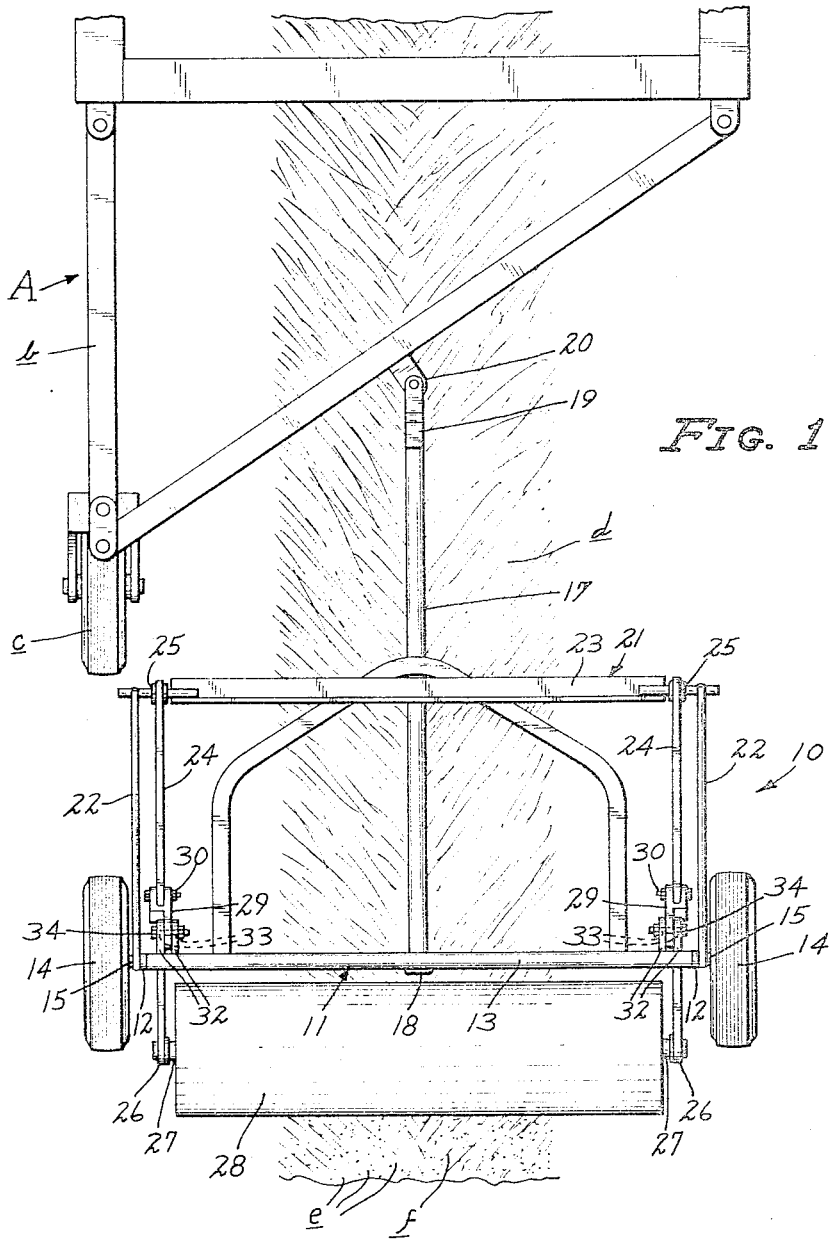
FIG. 1 is a view in top plan illustrating my invention in use behind a swather, of which, only the rear portion is shown.

Referring with greater particularity to the drawings there is shown the rear portion of a swather A which includes a frame *b* and a rear wheel *c*. Swather A, as it progresses through a field, cuts the crop being harvested and forms same into a windrow *d* for purposes of drying and subsequent pick-up and storage. As above mentioned heavy or gusty wind conditions often scatter or blow the windrow *d* across the field resulting in unnecessary waste and or labor in again gathering same. With the above in mind, I provide a roller mechanism indicated generally by the numeral 10 for draft behind the swather A. It will be understood that roller mechanism 10 is also adaptable to use behind other windrowing devices such as rotary rakes or the like. Roller mechanism 10 is shown as comprising an inverted generally U-shaped primary frame 11, having laterally spaced leg elements 12 and a connecting frame element 13. For the purpose of providing mobility to frame 11, a pair of ground engaging wheels 14 are, one each, journaled for rotation on trunnion elements 15 carried by the lower ends 16 of each of the leg elements 12. A draft tongue 17 has the rear end portion 18 thereof rigidly secured as by welding or the like to the intermediate portion of the connecting frame element 13 and projects forwardly therefrom to a point where it terminates in a hitch 19. Hitch 19 is secured to a drawbar 20 carried by the frame *b* of swather A.

A second generally U-shaped frame 21 also includes the laterally spaced leg elements 22 and connecting frame element 23. The intermediate portion of connecting frame element 23 is operatively secured by welding or the like, to the draft tongue 17 in forwardly spaced, generally parallel relation to the connecting frame element 13 of U-shaped frame 11 with the laterally spaced legs 22 thereof having their extended ends rigidly secured to the intermediate portion of legs 12 of frame 11. With this arrangement it will be seen that a rigid frame work is provided for the support of a pair of arms 24 and parts, to be described hereinafter, carried thereby. Arms 24 are shown as having one end of each thereof pivotally secured to opposite end portions of the connecting frame element 23 of U-shaped frame 21 as at 25 for raising and lowering movements of the rearwardly extended ends 26 thereof.

Secured to and journaled for rotation between the extended ends 26 of arms 24, by means of trunnions 27, is an axially elongated roller 28. As shown roller 28 is of an axial dimension whereby it extends for substantially the distance between the laterally spaced legs 12 of primary frame 11. Thus it will be seen that roller 28 will completely overlie the swath or windrow *d* formed by the swather A. It will also be noted that the rotary axis of roller 28 is parallel to the axes of the ground engaging wheels 14 so as to assure tracking of roller 28 with respect to wheels 14.

Suspending roller 28 in spaced relation to the ground, for a reason which will be explained in further detail at a later point, is a pair of elongated links 29. Links 29 each have their lower ends bifurcated and pivotally secured to the intermediate portions of the pivoted arms 24 as at 30. For purpose of vertical adjustment of arms 24 and roller 28, the upper end portion of links 29 are each formed to define longitudinally spaced apertures 31. Pairs of forwardly projecting brackets 32 are carried by the connecting frame element 13 of frame 11, one pair each in overlying relationship to one of the arms 24, are each provided with apertures 33 at their outer ends. When the apertures 33 formed in the outer ends of bracket elements 32 are aligned with selected ones of the apertures 31 of links 29, depending on the spacing required between the ground and roller 28, connecting pins 34 are inserted therethrough and roller 28 is thus suspended the required amount.

With the above objects in mind, and in view of the above described structure, it will be seen, particularly in FIG. 2, that the roller mechanism 10 may be adjusted to gently press the windrows of a harvested crop into the underlying stubble *e* as at *f*. Such being accomplished without undue pressure so as to anchor and prevent scattering or blowing of same across the field without packing the windrow *d* and preventing proper drying conditions.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

What is claimed is:

1. A device for draft behind an agricultural windrowing mechanism, said device comprising:
    (a) an inverted generally U-shaped primary frame comprising laterally spaced leg elements and a horizontally disposed connecting frame element,
    (b) a ground-engaging wheel journalled for rotation to the lower end of each leg element,
    (c) a draft tongue rigidly secured to the intermediate portion of said connecting frame element and projecting forwardly therefrom,
    (d) a secondary generally U-shaped frame also comprising laterally spaced leg elements and a connecting frame element,
    (e) means operatively securing the connecting frame element of said secondary frame to said draft tongue in forwardly spaced generally parallel relationship to the connecting frame element of said primary frame, (f) means rigidly securing the extended ends of the laterally spaced leg elements of said secondary frame to the leg elements of said primary frame, (g) a pair of arms one each pivotally secured to an opposite end portion of the connecting frame element of said secondary frame and projecting generally rearwardly therefrom for raising and lowering movements of their extended ends, (h) a roller element secured to and journalled for rotation between the extended ends of said arms, and (i) means connected to said arms and said primary frame for adjustably suspending said roller element in spaced relation to the ground.

2. The structure defined in claim 1 in which said last memtioned means comprises:

(a) a pair of elongated link elements one each having one end thereof pivotally connected to the intermediate portion of one of said arms and the other end portion of each thereof formed to define longitudinally spaced apertures therethrough, (b) a pair of forwardly projecting bracket elements carried by the connecting frame element of said primary frame one each in generally overlying relationship to one of said arms and the outer end of each thereof formed to define an aperture, and (c) connecting pins one each receivable through the aperture of each of said bracket elements and a selected one of the apertures of one of said connecting links.

3. The structure defined in claim 1 in which said roller element extends axially for substantially the distance between said laterally spaced legs of said U-shaped primary frame.

References Cited
UNITED STATES PATENTS

| | | | |
|---|---|---|---|
| 1,473,405 | 12/1923 | Goodell | 37—146 |
| 2,055,974 | 9/1936 | Greiner | 94—50 |
| 3,303,799 | 2/1967 | Britt | 94—50 |

ABRAHAM G. STONE, *Primary Examiner.*

ANTONIO F. GUIDA, *Examiner.*